(12) United States Patent
Tiszai

(10) Patent No.: US 6,336,395 B1
(45) Date of Patent: Jan. 8, 2002

(54) LATERAL FRYER LID LIFTING APPARATUS

(75) Inventor: Joseph Tiszai, Fairfield, OH (US)

(73) Assignee: Henny Penny Corporation, Eaton, OH (US)

( * ) Notice: Subject to any disclaimer, the term of this patent is extended or adjusted under 35 U.S.C. 154(b) by 0 days.

(21) Appl. No.: 09/797,694

(22) Filed: Mar. 5, 2001

(51) Int. Cl.$^7$ .............................. A47J 37/00; A47J 37/12
(52) U.S. Cl. ............................... 99/407; 99/336; 99/403
(58) Field of Search .................. 99/326–336, 403–417; 126/369, 391; 210/167, DIG. 8; 212/152; 220/315–318, 329, 363, 364; 292/257, 259

(56) References Cited

U.S. PATENT DOCUMENTS

| | | | | |
|---|---|---|---|---|
| 5,402,712 A | * | 4/1995 | King et al. | 99/407 |
| 5,974,955 A | * | 11/1999 | King et al. | 99/407 |
| 6,009,795 A | * | 1/2000 | Werts | 99/336 |
| 6,085,640 A | * | 7/2000 | King | 99/407 |
| 6,105,488 A | * | 8/2000 | King et al. | 99/407 |
| 6,112,646 A | * | 9/2000 | King et al. | 99/336 |

* cited by examiner

Primary Examiner—Timothy F. Simone
(74) Attorney, Agent, or Firm—Baker Botts L.L.P.

(57) ABSTRACT

In one embodiment of the present invention, a lifting lid assembly for raising or lowering a lifting lid of a cooking vessel is described. The lifting lid assembly has a lifting lid, a first shaft and a second shaft. The first shaft and the second shaft are positioned on a first side and a second side of the lifting lid, respectively, where the first side is opposite the second side, each shaft supports the lifting lid, and an upper portion of each shaft is secured platform to the lifting lid. The lifting lid assembly further has a first and a second platform, which are secured to a lower portion of the first shaft and the second shaft, respectively, and a first cable and a second cable connected to the first platform and the second platform, respectively. The lifting lid assembly also has a first spring motor and a second spring motor, where the first spring motor is connected to the first platform by the first cable, and the second spring motor is connected to the second platform by the second cable. In another embodiment of the present invention, the first shaft and the second shaft are below the lifting lid, and the upper portion of each shaft is substantially flush with an upper edge portion of the lifting lid.

42 Claims, 7 Drawing Sheets

LATERAL FRYER LID LIFTING APPARATUS

BACKGROUND OF THE INVENTION

1. Field of the Invention

The invention relates generally to an apparatus for raising or lowering a fryer lifting lid, such as a pressure fired fryer lifting lid. In particular, the present invention relates to a lifting lid assembly for raising or lowering a fryer lifting lid including a plurality of shafts secured to a first and second side of a lifting lid, respectively; a platform connected to each shaft; and means for raising or lowering the lifting lid connected to the platform.

2. Description of Related Art

A large capacity pressure cooker or pressure fired deep fat fryer generally includes a vat or cooking vessel of a sufficient size to receive a wire basket or tray carrier, in which the food product to be cooked is held. A suitable tray carrier may be configured to receive a plurality of food product trays. Such tray carriers are disclosed in U.S. Pat. No. 6,085,640, the disclosure of which is incorporated herein by reference. The basket or tray carrier is thereafter submersed in a cooking medium, such as melted shortening or cooking oil, which is contained in the vat or the cooking vessel. The cooking vessel may be closed by a lid, which makes a seal with an upper edge of the cooking vessel. The seal may maintain pressure within the vat or cooking vessel and prevent spillage and splashing of a cooking medium.

Alternatively, a large capacity cooker may be of an open-well design, as described in U.S. Pat. No. 5,402,712, the disclosure of which is incorporated herein by reference. In such cookers, the lid of the cooker is an open frame permitting direct access to the cooking vessel and to the food products submersed therein. The frame may support a wire basket for holding food products or a food tray carrier for carrying a plurality of trays containing food products. Although the frame does not form an air-tight seal with the upper edge of the cooking vessel, the frame also may reduce spillage and splashing of the cooking medium from the cooking vessel during cooking.

Referring to FIG. 1, in one known configuration, the lid lifting assembly includes a support frame 100 vertically oriented and secured to a rearward end of the pressure cooker. Support frame 100 includes a pair of vertical guide rails 102 and 104, each having a U-shaped cross-section and opening toward each other. Guide rails 102 and 104 are joined together at their upper and lower ends by top and bottom horizontal frame members 106 and 108. The front, rear, sides, and top of the support frame may be enclosed by panels, eg., stainless steel panels forming a lid lifting device housing, which forms a portion of a cooker cabinet or a cooker transfer cart. A frame-like carriage 120 is mounted vertically within support frame 100. Carriage 120 has rollers 122a-b and 124a-b which are adapted to be received within support frame guide rails 102 and 104, respectively. Consequently, carriage 120 may be positioned vertically within support frame 100. A pair of horizontal arms 126 and 128 may be affixed to carriage 120. Each of arms 126 and 128 extend from carriage 120 toward the cooker lid through a vertical slot (not shown) in the panel covering the front of support frame 100 or between the front and side panels. The cooking vessel lid of the fryer is mounted on horizontal arms 126 and 128.

A cable drum 130 may be driven by an electric motor 132 mounted on top horizontal frame member 106. In a further known configuration, a pair of cables 134 and 136 are provided, each cable having one end attached to drum 130 and the other end attached to carriage 120. One of the cables may be slightly longer than the other and, consequently, the longer cable does not bear the weight of carriage 120. The longer cable serves as a back-up cable if the primary cable fails. Drum 130 is rotatable in a first direction by electric motor 132 to raise carriage 120 within support frame 100 and consequently raising arms 126 and 128 and the lid therewith. Drum 130 is rotatable in the opposite direction by electric motor 132 to lower carriage 120 within support frame 100 and to lower arms 126 and 128 and the lid therewith. In this manner, the lid of the pressure cooker is shifted between its lowered position seated upon the upper edge of the cooking vessel and its raised position.

In yet another known configuration, the cooker lid may be pivotally mounted to a support brace for pivotally mounting the cooker lid on a monorail lifting device, and the lid also may be manually raised and lowered with the assistance of a counterbalance weight supported in the lid lifting device housing, as described in U.S. Pat. No. 5,974,955, the disclosure of which is incorporated herein by reference.

In a closed lid cooker or a pressure fired fryer, the food product is cooked for the desired length of time under both elevated heat and pressure. Following the cooking cycle, an operator may relieve the pressure in the vat or cooking vessel and then may open the lid in order to remove the wire basket or fryer tray carrier or may simply remove the food product from the wire basket or fryer tray carrier.

Regardless whether an open or closed lid fryer is used, the lid may include a wire basket or a tray carrier loaded with trays and food product covered with residual cooking medium and may be heavy and may be difficult to raise and lower. Further, because the lid must be of sufficiently heavy construction to properly withstand the pressure within the cooking vessel during the cooking cycle, it may be difficult for some operators to lift the lid to load or unload the cooker, or remove the wire basket or fryer tray carrier. To overcome this problem, operators have employed various types of automatic apparatus for opening and closing the cooker lid. In some instances, these various apparatus are used to additionally hold the lid down and in a sealed position during the pressurized operation of the cooker.

Some known lid raising and lowering apparatus require powerful power train means. The positioning of the lid lifting apparatus behind the vat or cooking vessel makes maintenance and repair awkward. Further, lid lifting creates additional torque on the lid lifting apparatus when raising or lowering a full or partially full wire basket or tray carrier. Electro-mechanical or hydraulic systems have been used for opening and closing the lid, but these systems have experienced significant maintenance problems and resultant down-time. In addition, some of the raising and lowering means are sufficiently complex to require a skilled operator. As a result, efforts to mechanize the operation of large capacity pressure cookers by means of electro-mechanical or hydraulic controls for raising and lowering the lids of the cooking vessels have on occasion produced more problems than they have solved. In addition, the more complex and the more exposed the raising and lowering apparatus, the more susceptible the apparatus is to the adverse effects due to contamination of operating components with dust, dirt, and cooking medium residue.

SUMMARY OF THE INVENTION

Thus, a need has arisen for a lifting lid assembly that is sufficiently strong to support a lifting lid during a covering and uncovering of a cooking vessel, but which also may be compact and of light weight.

A further need has arisen for a lid lifting apparatus that avoids excess torque when raising or lowering a fall or partially full wire basket or tray carrier. It is an advantage of the present invention that it utilizes the mechanically advantageous positioning of the lifting shafts at or near the center of gravity of the lifting lid.

Still a further need has arisen for a lid lifting apparatus the components of which are positioned at opposite sides of the vat or cooking vessel. It is a feature of this design that the shafts, shaft/lid connections, and lifting apparatus are readily accessible from the sides or front of the fryer. It is an advantage of this positioning of the lifting apparatus that it may be more readily maintained and repaired without the need to obtain access to the rear of the fryer or to work over the vat or cooking vessel or over or under the lifting lid.

According to an embodiment, the present invention is a lifting lid assembly for raising and lowering a lifting a lifting lid of a cooking vessel. The lifting lid assembly comprises a lifting lid and a first shaft and a second shaft. The shafts are positioned on a first side and a second side of the lifting lid, respectively, where the first side is opposite the second side, each shaft supports the lifting lid, and an upper portion of the shaft may be secured to the lifting lid. The lifting lid assembly farther comprises a first platform and a second platform, which platforms are secured to a lower portion of the first shaft and the second shaft, respectively, and a first pair and a second pair of spring motor cables. At least one of the first pair and the second pair of cables is connected to the first and the second platforms, respectively. The lifting lid assembly also comprises a first pair and a second pair of spring motors. Each of the first pair and the second pair of spring motors is connected to the first platform and the second platform, respectively, by at least one of the first pair and the second pair of spring motor cables, respectively.

The spring motor cables also may be wound to raise the lifting lid. Moreover, the first shaft and the second shaft also may be positioned below the lifting lid, and the upper portion of each shaft may be substantially flush with an upper edge portion of the lifting lid.

In another embodiment, the present invention is a lifting lid assembly for raising and lowering a lifting lid of a cooking vessel. The lifting lid assembly comprises a lifting lid and a first shaft and a second shaft. The shafts are positioned on a first side and a second side of the lifting lid, respectively, where the first side is opposite the second side, each shaft supports the lifting lid, and an upper portion of each shaft may be secured to the lifting lid. The lifting lid assembly further comprises a first platform and a second platform, which platforms are secured to a lower portion of the first shaft and the second shaft, respectively, and a first spring cable and a second spring cable. The first cable and the second cable are connected to the first platform and the second platform, respectively. The lifting lid assembly also comprises spring means, which are adapted to assist in a raising and lowering of the lifting lid. The spring means are connected to the first platform by the first spring cable, and to the second platform by the second spring cable. Further, in this embodiment, the first spring cable and the second spring cable are wound to raise the lifting lid, the first shaft and the second shaft are positioned below the lifting lid, and the upper portion of each shaft is substantially flush with an upper edge portion of the lifting lid.

The lifting lid assembly further may comprise a first counterbalance weight and a second counterbalance weight connected to the first platform and the second platform, respectively, by a first counterbalance cable and a second counterbalance cable threaded through a first pulley and a second pulley, respectively. Each of the counterbalance weights may be positioned at a rearward side of the fryer, and may be adapted to assist the spring means in raising and lowering the lifting lid.

In still another embodiment, the present invention is a lifting lid assembly for raising and lowering a lifting lid of a cooking vessel. The lifting lid assembly comprises a lifting lid and a first shaft and a second shaft. The shafts are positioned on a first side and a second side of the lifting lid, respectively. The first side is opposite the second side, each shaft supports the lifting lid, and an upper portion of each shaft may be secured to the lifting lid. The lifting lid assembly further comprises a first platform and a second platform, which platforms are secured to a lower portion of the first shaft and the second shaft, respectively, and a first cable and a second cable connected to the first platform and the second platform, respectively. The lifting lid assembly also comprises means for raising and lowering the lifting lid. The means for raising and lowering the lifting lid is connected to the first platform by the first cable, and to the second platform by the second cable.

The first shaft and the second shaft may be positioned below the lifting lid, and the upper portion of each shaft may be substantially flush with an upper edge portion of the lifting lid. Moreover, the means for raising and lowering the lifting lid may comprise a first spring connected to the first platform by the first cable, and a second spring connected to the second platform by the second cable. The first cable and the second cable may be wound to raise the lifting lid. Further, the means for raising and lowering the lifting lid may comprise a first age counterbalance weight and a second counterbalance weight connected to the first platform and the second platform, respectively, by a first counterbalance cable and a second counterbalance cable threaded through a first pulley and a second pulley, respectively. Each of the counterbalance weights may be positioned at rear side of the fryer, and may be adapted to assist the spring means in raising and lowering the lifting lid.

Other objects, features, and advantages will be apparent to persons of ordinary skill in the art in view of the following detailed description of the invention and the accompanying drawings.

BRIEF DESCRIPTION OF THE DRAWINGS

For a more complete understanding of the present invention, the needs satisfied thereby, and the features and advantages thereof, reference now is made to the following descriptions taken in connection with the accompanying drawings.

DETAILED DESCRIPTION OF PREFERRED EMBODIMENTS

Figure 1:
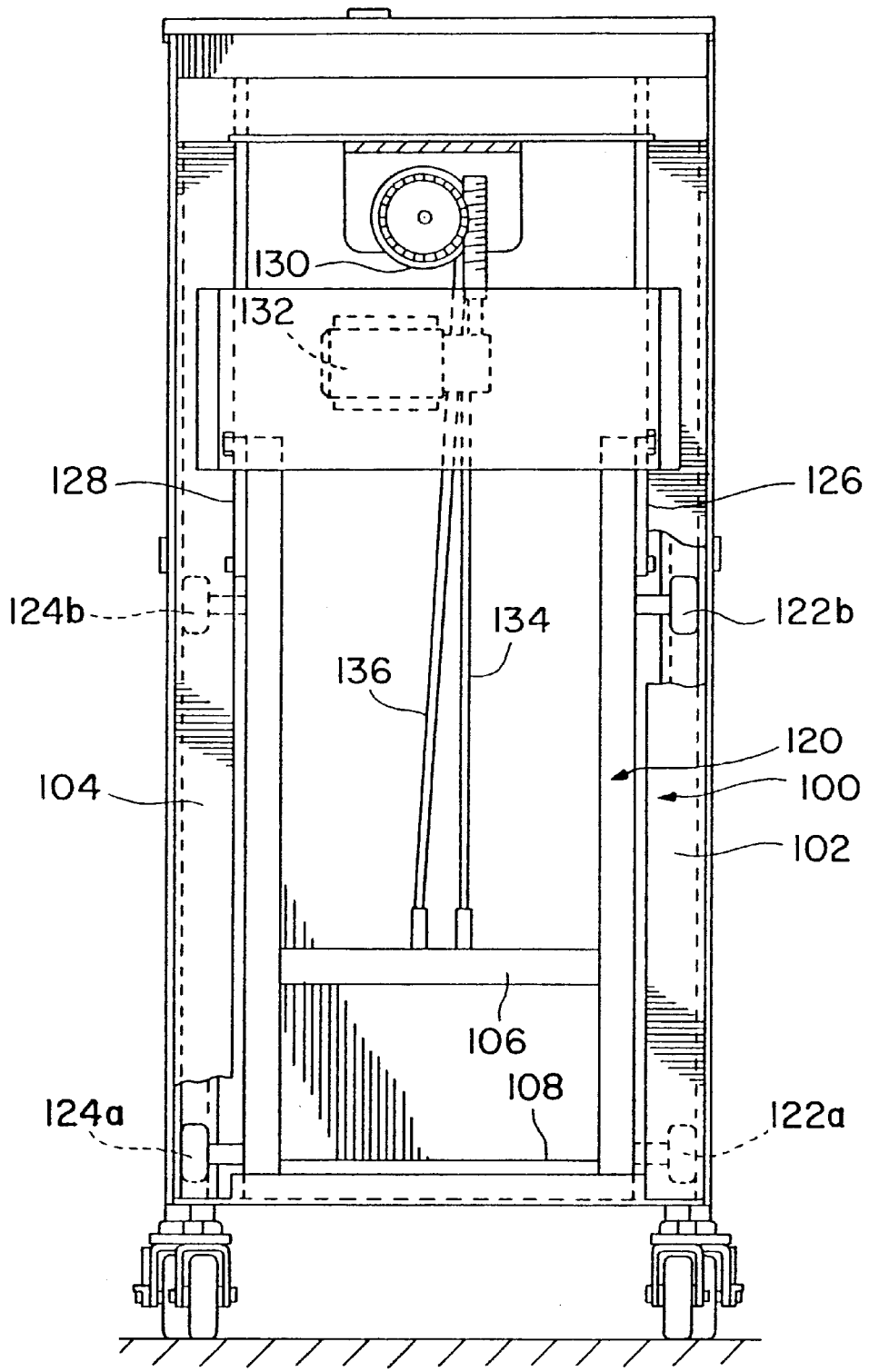
FIG. 1 is a rear view of a known lifting lid assembly for an open lid fryer.
Figure 2:
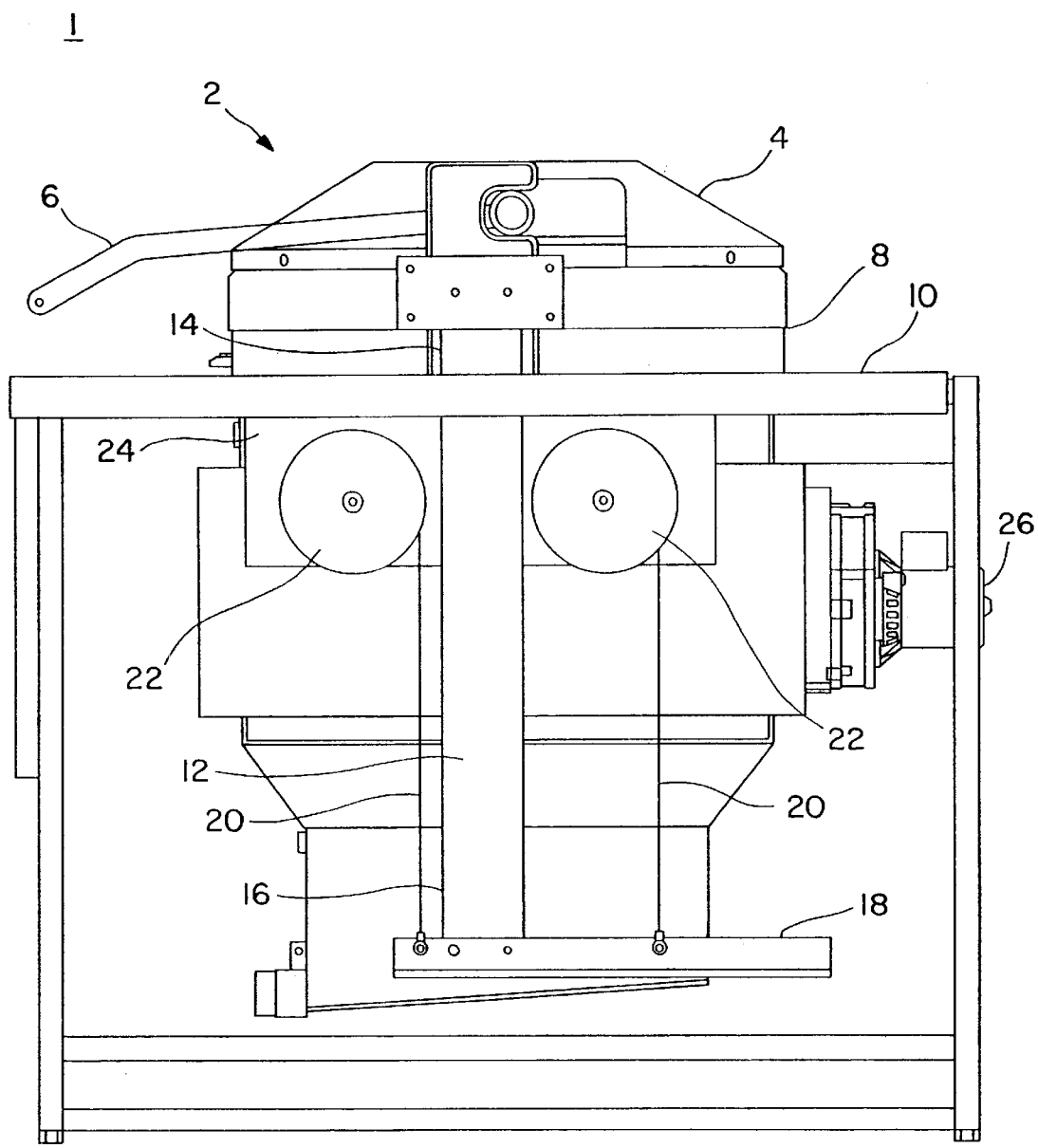
FIG. 2 is a side view of a cooking vessel, including a lifting lid assembly for raising and lowering a lifting lid of the cooking vessel, according to an embodiment of the present invention.
Figure 3:
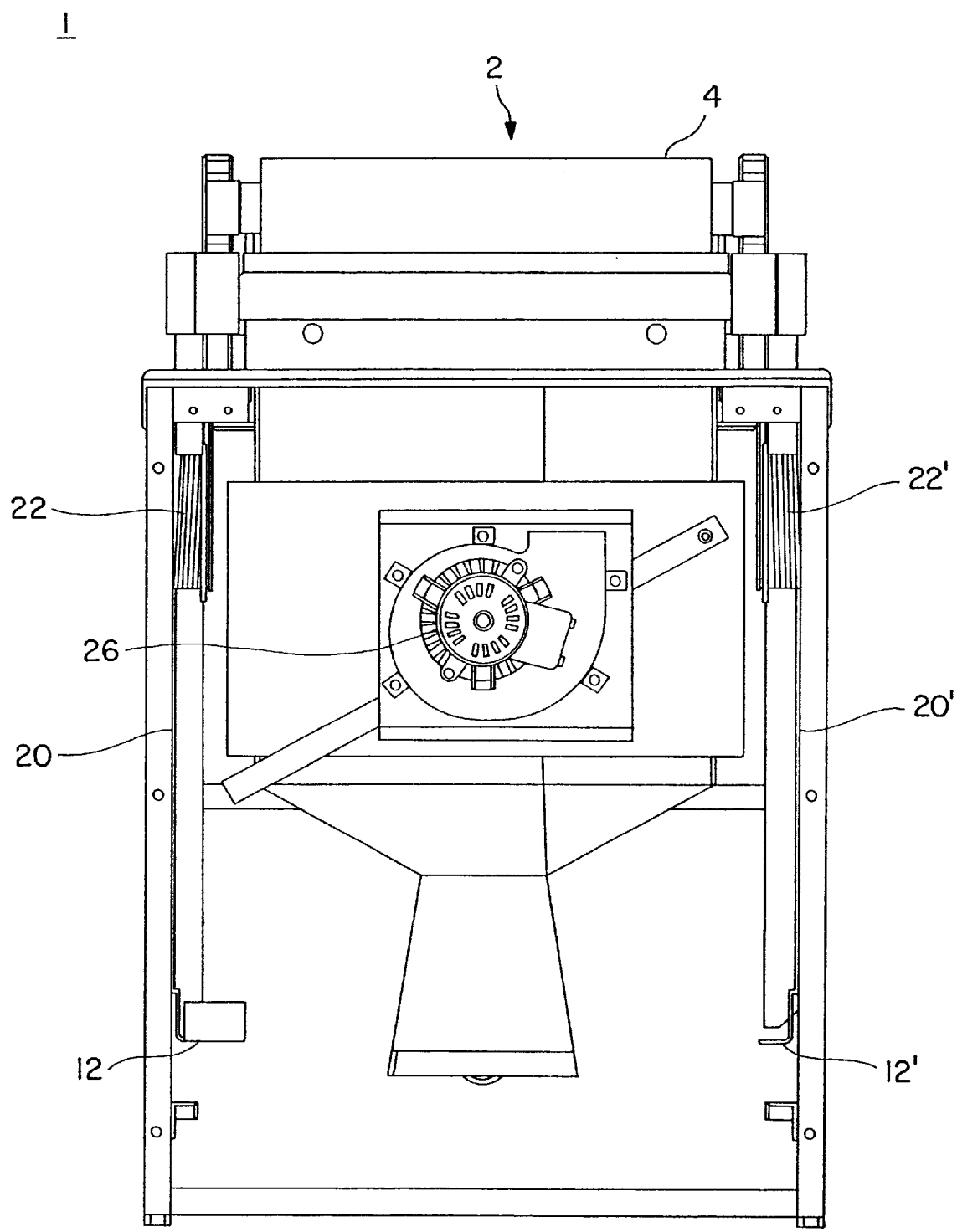
FIG. 3 is a rear view of the cooking vessel of FIG. 2.
Figure 4:
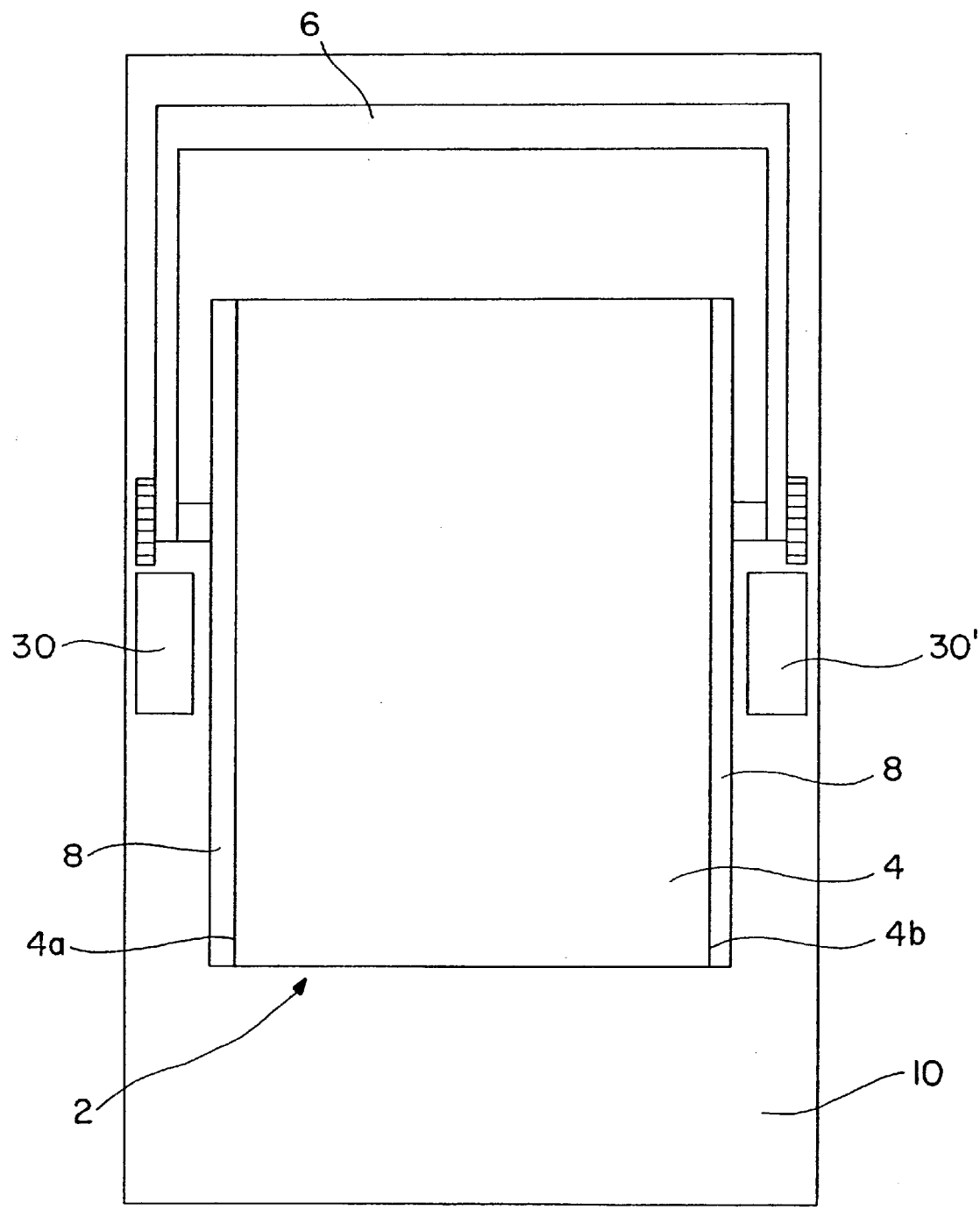
FIG. 4 is a top view of the cooking vessel of FIG. 2.
Figure 6:
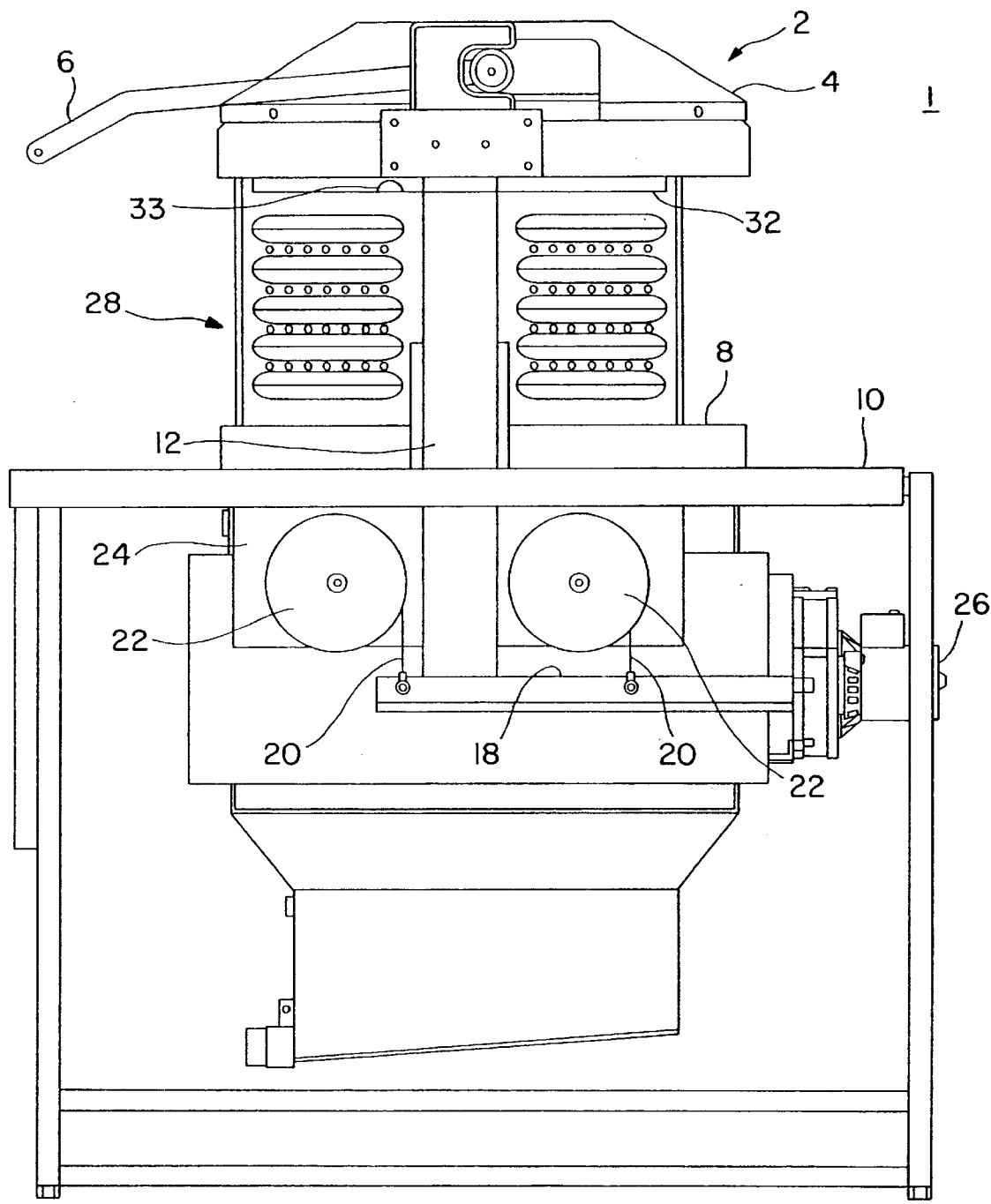
FIG. 6 is a side view of the cooking vessel of FIG. 2, showing the lifting lid assembly in a raised position with the food carrier apparatus of FIG. 5 suspended beneath the lifting lid assembly.

Referring to FIGS. 2–4, a side, rear, and top view of a cooking vessel including a lifting lid assembly 1 for raising a fryer lid from or lowering it to the cooking vessel are described, respectively. Lifting lid assembly 1 may comprise a lifting lid 2 for a closed lid cooker. Lifting lid 2 may comprise a handle 6, by which an operator may manually raise or lower lifting lid 2. Alternatively, an operator may assist a first spring means and a second spring means in raising or lowering lifting lid 2. Lifting lid 2 further may comprise a substantially rectangular top portion 4, and an upper edge portion 8. Upper edge portion 8 may be secured to a vat lip 10. Top portion 4 of lifting lid 2 may comprise a first side 4a and a second side 4b, where first side 4a may be opposite second side 4b. In addition, lifting lid 2 also may comprise a pair of supporting rails 32, as shown in FIG. 6. Supporting rails 28 may be substantially parallel to each other, and also may extend longitudinally beneath lifting lid 2.

Lifting lid assembly 1 further may comprise a first shaft 12 and a second shaft 12'. First, shaft 12 may be positioned on first side 4a, and second shaft 12' may be positioned on second side 4b. Shafts 12 and 12' also may be suspended below lifting lid 2, and may be substantially parallel to each other. First shaft 12 may comprise a first upper portion 14 and a first lower portion 16. Similarly, second shaft 12' may comprise a second upper portion 14' and a second lower portion 16'. Upper portions 14 and 14' may be located on first shaft 12 and second shaft 12', respectively, at a position located above the first spring means and the second spring means, respectively. Lower portions 16 and 16' may be located on first shaft 12 and second shaft 12', respectively, at a position located below the first spring means and the second spring means, respectively. Moreover, upper portions 14 and 14' may be secured to and may support lifting lid 2. Upper portions 14 and 14' also may be substantially flush with upper edge portion 8 of lifting lid 2.

Lifting lid assembly 1 further may comprise a first platform 18 and a second platform 18'. First platform 18 may be secured to lower portion 16 of first shaft 12. Similarly, second platform 18' may be secured to lower portion 16' of second shaft 12'. Lifting lid assembly 1 also may comprise a first cable 20 and a second cable 20'. First cable 20 and second cable 20' may each be spring cables. Moreover, each of first cable 20 and second cable 20' also may comprise a pair of spring cables. Each pair of first spring cables 20 may be connected to platform 18, and each pair of second spring cables 20' may be connected to platform 18'. First spring cable pair 20 and second spring cable pair 20' may support first platform 18 and second platform 18', respectively. In an embodiment of the present invention in which at least one of the first spring means and the second spring means are at least one spring motor, at least one of first spring cable pairs 20 and second spring cable pair 20' may be spring motor cable pairs. First spring motor cable pair 20 and second spring cable pair 20' may be stainless steel cables coated with nylon or a similar polymer.

Lifting lid assembly 1 farther may comprise the first spring means and the second spring means, which may be adapted to assist in a raising and lowering of lifting lid 2.

The first spring means may be connected to at least one first spring cable 20, and also may be mounted to a first spring mounting plate 24. Similarly, the second spring means may be connected to at least one second spring cable 20', and also may be mounted to a second spring mounting plate 24'. Moreover, at least one first spring cable 20 may be wound around the first spring means, and at least one second spring cable 20' may be wound around the second spring means. Winding at least one first spring cable 20 and second spring cable and 20' around or unwinding at least one of these cables from the first spring means and second spring means, respectively, may allow first spring cable 20 and second spring cable 20' to raise or lower lifting lid 2, thereby covering and uncovering the cooking vessel.

The first spring means may be a first spring motor 22, and the second spring means may be a second spring motor 22'. For example, a ML2801 NEG'ATOR® constant-force spring motor or a SH25U48 SPIR'ATOR® extended eye spring manufactured by Ametek, Inc., of Pennsylvania, United States, may be used. Alternatively, a spring motor having about 35 pounds (15.9 kg) of preload and a substantially constant force over about 16 inches (40.64 cm) to 18 inches (45.72 cm) of distance may be used. This embodiment is substantially similar to the embodiment shown in FIG. 2, except that one of the first spring motors 22, and the corresponding first spring motor cable 20, would not be included in this embodiment. Similarly, one of the second spring motors 22', and the corresponding second spring motor cable 20', would not be included in this embodiment. In addition, the remaining first spring motor 22 and the remaining second spring motor 22' may be aligned substantially in the center of listing lid assembly 1, to balance the first platform 18 and the second platform 18', respectively. First spring motor 22 and second spring motor 22' each may be required to provide a sufficient amount of upward force to assist in the raising of lifting lid 2, and also may be required to be of a sufficiently small size, such as to fit within lifting lid assembly 1. The amount of upward force required by first spring motor 22 and second spring motor 22' may depend on a weight of lifting lid 2; first shaft 12 and second shaft 12', respectively; and first platform 18 and second platform 18', respectively. The amount of required force also may depend on a weight of a removably mounted, food carrier apparatus 28 (shown in FIG. 5); a number and a weight of food carrier trays (not shown), and the like; and a weight of a food product (not shown) on each food carrier tray.

First spring motor 22 may be connected to at least one first spring motor cable 20 and also may be mounted to first spring mounting plate 24. Similarly, second spring motor 22' may be connected to at least one second spring motor cable 20' and also may be mounted to second spring mounting plate 24'. In this embodiment of the present invention, at least one first spring motor cable 20 may be wound around first spring motor 22, and at least one second spring motor cable 20' may be wound around second spring motor 22'. Winding at least one first spring motor cable 20 and second spring motor cable 20' around or unwinding at least one of these cables from first spring motor 22 and second spring motor 22', respectively, may allow first spring motor cable 20 and second spring motor cable 20' to raise or lower lifting lid 2, thereby covering and uncovering the cooking vessel. In addition, although a combustion blower assembly 26 primarily supplies combustion air to the fryer burners and heated air through the fryer heating conducts, blower assembly 26 may cool first spring motor 22 and second spring motor 22' during the raising and lowering of lifting lid 2.

In yet another embodiment of the present invention, the spring means may be a first spring motor pair 22, and the second spring means may be a second spring motor pair 22'. For example, a ML2801 NEG'ATOR® constant-force spring motor or a SH25U48 SPIR'ATOR® extended eye spring manufactured by Ametek, Inc., of Pennsylvania, United States, may be used. Alternatively, a spring motor having about 35 pounds (15.9 kg) of preload and a substantially constant force over about 16 inches (40.64 cm) to 18 inches (45.72 cm) of distance may be used. Each spring motor of spring motor pair 22 and second spring motor pair 22' may be required to provide a sufficient amount of upward force to assist in the raising of lifting lid 2, and also may be sized, so as to fit within lifting lid assembly 1. The amount of upward force required by each first spring motor pair 22 and second spring motor pair 22' may depend on a weight of lifting lid 2; first shaft 12 and second shaft 12', respectively; and first platform 18 and second platform 18', respectively. The amount of force required also may depend on a weight of a removably mounted food carrier apparatus 28 (shown in FIG. 5); a number and weight of food carrier trays (not shown), and the like; and a weight of a food product (not shown) on each food carrier tray.

Each first spring motor 22 may be connected to at least one first spring motor cable 20 and also may be mounted to first spring mounting plate 24. Similarly, each second spring motor 22' may be connected to at least one second spring motor cable 20' and also may be mounted to second spring mounting plate 24'. Moreover, in this embodiment of the present invention, first shaft 12 may be positioned between the first pair of spring motors 22, and second shaft 12' may be positioned between the second pair of spring motors 22'. In addition, at least one first spring motor cable 20 may be wound around each first spring motor 22, and at least one second spring motor cable 20' may be wound around each second spring motor 22'. Winding at least one first spring motor cable 20 and second spring motor cable 20' around or unwinding at least one of these cables from each first spring motor 22 and each second spring motor 22', respectively, may allow first spring motor cables 20 and second spring motor cables 20' to raise or lower lifting lid 2, thereby covering and uncovering the cooking vessel. In addition, combustion blower assembly 26 may cool first spring motor pair 22 and second spring motor pair 22' during the raising and lowering of lifting lid 2.

In other embodiments of the present invention, the first spring means and the second spring means may comprise conventional springs, such as a tension spring; air springs; gas-loaded piston-type springs; and the like. The first spring means and the second spring means also may comprise combinations of at least one spring motor and at least one conventional spring. If the at least one spring motor malfunctions or fails during a raising or lowering of lifting lid 2, having at least one spring motor in combination with at least one conventional spring may prevent lifting lid 2 from collapsing at a speed which may damage lifting lid 2.

Further, each conventional spring may be required to provide a sufficient amount of upward force to assist in the raising of lifting lid 2 and also may be sized, so as to fit within lifting lid assembly 1. The amount of upward force required by each conventional spring may depend on a weight of lifting lid 2; first shaft 12 and second shaft 12'; and first platform 18 and second platform 18'. The amount of required force also may depend on a weight of a removably mounted food carrier apparatus 28 (shown in FIG. 5); a number of, and a weight of a food carrier trays (not shown), and the like; and a weight of a food product (not shown) on each food carrier tray.

In an embodiment in which at least one of the spring means comprises at least one gas-loaded, piston-type spring, lifting lid assembly I further may comprise insulation (not shown) for keeping a temperature of the gas-loaded, piston-type spring below a predetermined temperature. The predetermined temperature may be a temperature at which a density of the gas changes from its normal operating density, which may be about 120° F. (48.9° C.).

In yet another embodiment of the present invention, an electric motor (not shown) may be used in combination with the first spring means or the second spring means to assist the first spring means or the second spring means in winding and unwinding at least one first spring cable 20 or at least one second spring cable 20'.

Lifting lid assembly 1 also may comprise a vat lip 10, which may support lifting lid 2. Vat lip 10 may comprise first shaft guide 30 and second shaft guide 30'. First shaft 12 and second shaft 12' may be disposed within first shaft guide 30 and second shaft guide 30', respectively.

Figure 5:
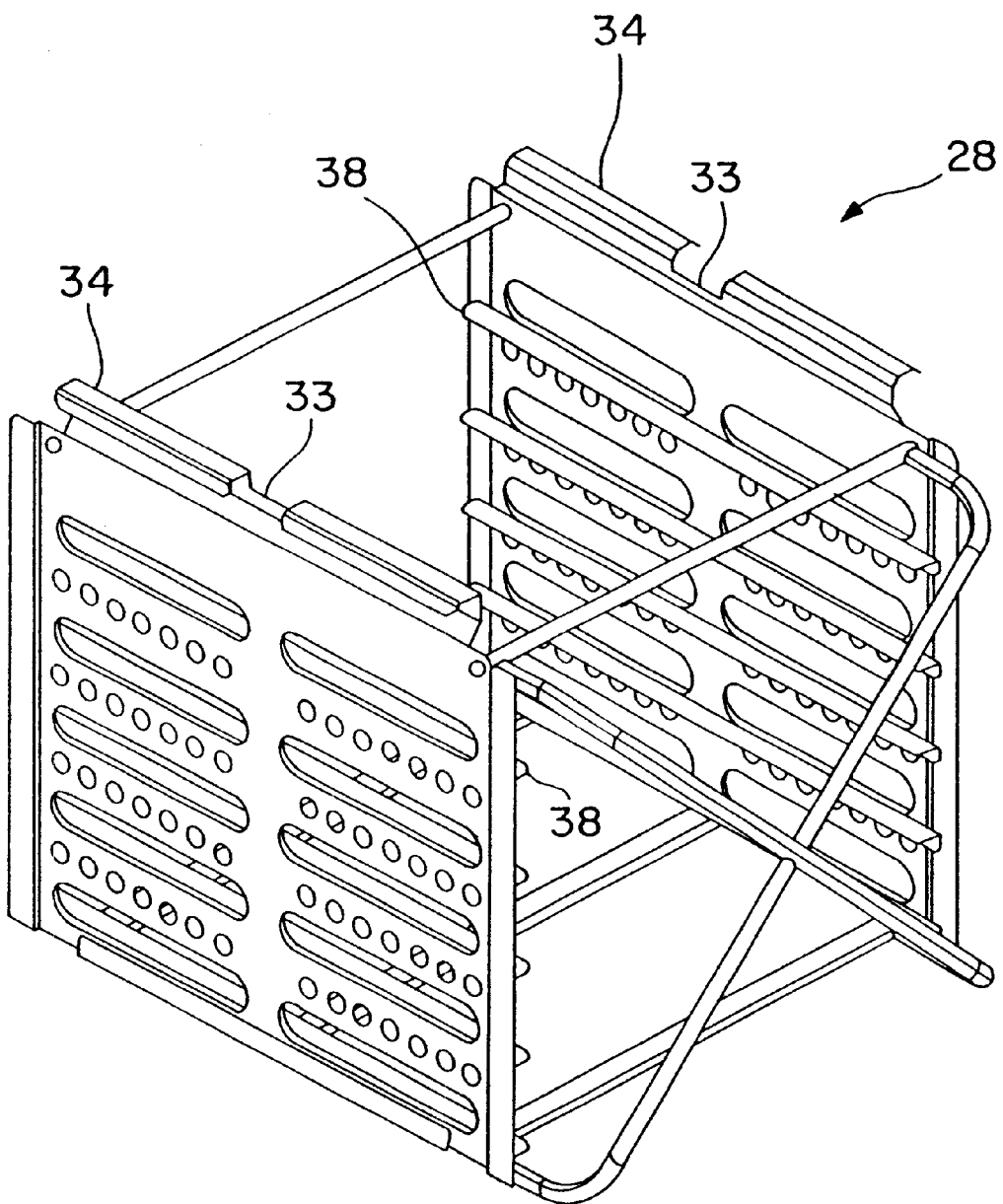
FIG. 5 is a perspective view of a food carrier apparatus, which may be suspended below the lifting lid assembly of FIGS. 2–4.

Referring to FIGS. 5 and 6, lifting lid assembly 1 further may comprise a removably mounted, food carrier apparatus 28, such as that described in FIG. 5. Food carrier apparatus 28 may be suspended beneath lifting lid 2. Alternatively, it may be a wire basket, such as those used to cook french fries in many restaurants; a tray carrier having a plurality of slots, each for receiving a food product carrier trays; or the like. Food product carrier trays may be wire baskets or may be fabricated from sheet metal and may include a plurality of openings which may permit a cooking medium to flow through the tray. Food carrier apparatus 28 may comprise a pair of carrier tray arms 34. Pairs of carrier tray arms 34 may extend in parallel to each other, and each carrier tray arm 34 may be adapted to engage supporting rails 32 which extend beneath lifting lid 2. Food carrier apparatus 28 also may comprise a food carrier apparatus stop 33 formed on each supporting rail 32, which may be adapted to secure food carrier apparatus 28 on rails 32 of lifting lid 2. A carrier stop receiving gap 36 is formed in each carrier tray 34 to receive one of food carrier apparatus stops 33 from rails 32. Moreover, food carrier apparatus 28 further may comprise a plurality of food tray support brackets 38. Food tray support brackets 38 may be adapted to receive a plurality of configurations of food product carrier trays. As described above, these food product carrier trays may be wire baskets or sheet metal trays including a plurality of openings which may permit a cooking medium to flow through such trays, or the like.

Referring to FIG. 6, lifting lid assembly 1, as described in FIGS. 2–5, is shown in a raised position. As described above, in this embodiment, an operator may use handle 6 to manually raise and lower lifting lid 2. The operator also may assist the first and the second spring means in raising or lowering lifting lid 2. In a pressure cooker or pressure fired fryer, lifting lid 2 may comprise a solid, substantially rectangular top portion 4, and may have a gasket (not shown) for forming an air-tight seal with upper edge portion 8 of the cooking vessel. Such a lifting lid for a pressure cooker or pressure fired fryer is described in U.S. Design Pat. No. 336,007 and U.S. Pat. No. 4,930,408, the disclosures of which are incorporated herein by reference.

In the above-described embodiments, when handle 6 is used to raise lifting lid 2, at least one first spring cable 20 and at least one second cable 20 may wind around the first and the second spring means, respectively. Winding at least one first spring cable 20 and at least one second spring cable 20' around the first spring means and the second spring means, respectively, may raise first platform 18 and second platform 18' towards the first spring means and the second spring means, respectively. In addition, because first platform 18 and second platform 18' are secured to lower portions 16 and 16' of first shaft 12 and second shaft 12', respectively, first shaft 12 and second shaft 12' may be raised along a vertical axis through first shaft guide 30 and second shaft guide 30', respectively. Raising first shaft 12 and second shaft 12' may uncover lifting lid 2 from vat lip 10 and also may allow the operator to access food carrier apparatus 28.

Figure 7:
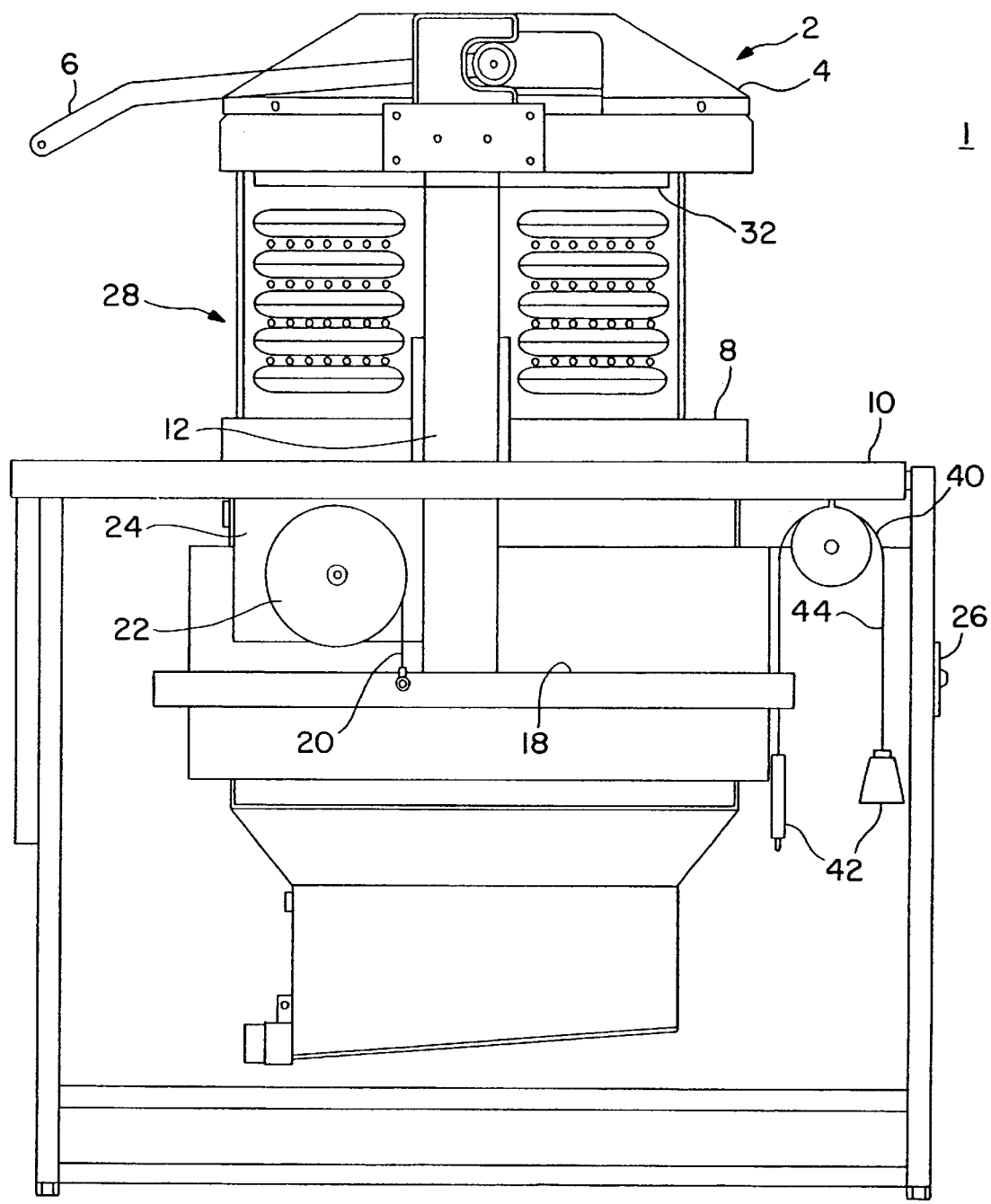
FIG. 7 is a side view of a cooking vessel, including a lifting lid assembly for raising and lowering a lifting lid of the cooking vessel, according to another embodiment of the present invention.

Referring to FIG. 7, yet another embodiment of the present invention is described. The features of this embodiment are substantially similar to those features of the above-described embodiments. Therefore, the differences between this embodiment and the above-described embodiments will now be described.

In this embodiment, lifting lid assembly 1 may comprise means for raising and lowering lifting lid 2. The means for raising and lowering lifting lid 2 may comprise a first counterbalance weight 42, or alternatively, may comprise a second counterbalance weight 42'. The means for raising and lowering lifting lid 2 also may comprise both first counterbalance weight 42 and second counterbalance weight 42'. In this embodiment, first counterbalance weight 42 may be connected to first platform 18 by a first counterbalance cable 44 threaded through a first pulley 40. Similarly, second counterbalance weight 42' may be connected to second platform 18' by a second counterbalance cable 44' threaded through a second pulley 40'. In addition, first platform 18 and second platform 18' each may be a length greater than a length of rectangular top portion 4 of lifting lid 2.

The means for raising and lowering lifting lid 2 also may comprise the first spring means and the second spring means of the above-described embodiments. Moreover, the means for raising and lowering lifting lid 2 may be the first spring means and the second spring means in combination with first counterbalance weight 42 or second counterbalance weight 42'. In one embodiment, the means for raising and lowering lifting lid 2 may comprise first spring motor 22, second spring motor 22', first counterbalance weight 42, and second counterbalance weight 42'. In another embodiment, the means for raising and lowering lifting lid 2 may comprise first spring motor 22, first counterbalance weight 42, and second spring motor pair 22'. However, these embodiments are merely illustrative, and it will be understood by one of ordinary skill in the art that this embodiment may use various combinations of at least one spring means and at least one counterbalance weight.

EXAMPLES

Embodiments of the present invention will be further clarified by consideration of the following examples, which are intended to be purely exemplary of the use of the invention.

Referring to FIGS. 2–6, an embodiment of a lifting lid assembly 1 was constructed. Constructed lifting lid assembly 1 comprised a lifting lid 2 for a closed lid cooker. Lifting lid 2 comprised a handle 6, a top portion 4, and an upper edge portion 8, where upper edge portion 8 was secured to a vat lip 10. Top portion 4 of lifting lid 2 comprised a first side 4a and a second side 4b, where first side 4a was opposite second side 4b. In addition, lifting lid 2 also comprised a pair of supporting rails 32, which were substantially parallel to each other, and extend longitudinally beneath lifting lid 2.

Lifting lid assembly 1 further comprised first shaft 12 and second shaft 12'. First shaft 12 was positioned on first side 4a, and second shaft 12' was positioned on second side 4b. First shaft 12 and second shaft 12' were positioned below lifting lid 2, and also were substantially parallel to each other. First shaft 12 comprised a first upper portion 14 and a first lower portion 16. Similarly, second shaft 12' comprised a second upper portion 14' and a second lower portion 16'. Upper portions 14 and 14' were located on first shaft 12 and second shaft 12', respectively, at a position located above a first and a second pair of spring motors 22 and 22', respectively. Lower portions 16 and 16' were located on shafts 12 and 12', respectively, at a position located below first pair of spring motors 22 and second pair of spring motors 22', respectively. Moreover, upper portions 14 and 14' were secured to lifting lid 2. Upper portions 14 and 14' also were substantially flush with upper edge portion 8 of lifting lid 2.

Lifting lid assembly 1 further comprised first platform 18 and second platform 18'. First platform 18 was secured to lower portion 14 of first shaft 12. Similarly, second platform 18' was secured to lower portion 16 of second shaft 12'. Lifting lid assembly 1 also comprised first spring motor cable pair 20 and second spring motor cable pair 20'. Each first pair of spring motor cables 20 was connected to first platform 18, and each second pair of spring motor cables 20' was connected to second platform 18'. First spring cable pair 20 and second spring cable pair 20' also supported first platform 18 and second platform 18', respectively.

Lifting lid assembly 1 further comprised a first pair of spring motors 22, and a second pair of spring motors 22'. Each spring motor of first spring motor pair 22 was connected to one spring motor cable of first spring cable pair 20 and also was mounted to first spring mounting plate 24. Similarly, each spring motor of second spring motor pair 22' was connected to one spring motor cable of second spring cable pair 20' and also was mounted to second spring mounting plate 24'. Moreover, first shaft 12 was positioned between first spring motor pair 22, and second shaft 12' was positioned between second spring motor pair 22'. In addition, first spring motor cables 20 were each wound around one first spring motor 22, and second spring motor cables 20' were each wound around one second spring motor 22'. The winding of first spring motor cables 20 and 20' around or unwinding of these cables from each first spring motor 22 and each second spring motor 22', respectively, allowed first spring motor cables 20 and second spring motor cables 20' to raise or lower lifting lid 2, thereby covering and uncovering the cooking vessel.

Moreover, each spring motor of first spring motor pair 22 and each spring motor of second spring motor pair 22' provided a sufficient amount of upward force to assist in the raising of lifting lid 2. The amount of upward force required by first spring motor pair 22 and second spring motor pair 22' depended on a weight of lifting lid 2; first shaft 12 and second shaft 12'; and first platform 18 and second platform 18'. In the embodiment described in this example, the weight of lifting lid 2; first shaft 12 and second shaft 12; and first platform 18 and second platform 18', was a substantially constant value. The substantially constant value was between about 90 pounds (40.9 kg) and about 105 pounds (47.7 kg), and represented a minimum load of lifting lid assembly 1. Thus, when lifting lid assembly 1 was at its minimum load, first spring motor pair 22 and second spring motor pair 22' operated with at least between about 45 pounds (20.4 kg) and about 52.5 pounds (23.9 kg) of upward force. Further, each spring motor of first spring motor pair 22 and second spring motor pair 22', respectively, operated with at least between about 22.5 pounds (10.2 kg) and about 26.25 pounds (11.9 kg) of upward force.

In addition, the maximum amount of force required to assist in the raising of lifting lid 2 was experienced when lifting lid assembly 1 further comprised a removably mounted food carrier apparatus 28; five food carrier trays (not shown) and the like; and a chicken breast product (not shown) placed on each food carrier tray. When lifting lid assembly 1 comprised all of the elements described above, the maximum load was between about 125 pounds (56.8 kg) and 140 pounds (63.6 kg). Thus, when lifting lid assembly 1 was at its maximum load, first spring motor pair 22 and second spring motor pair 22' operated with at least between about 62.5 pounds (28.4 kg) and about 70 pounds (31.8 kg) of upward force. Further, each spring motor of first spring motor pair 22 and second spring motor pair 22', respectively, operated with at least between about 31.25 pounds (14.2 kg) and about 35 pounds (15.9 kg) of upward force.

Referring to FIG. 7, another embodiment of lifting lid assembly 1 was constructed. The features of the embodiment described in this example were substantially similar to those features of the above-described embodiment. Therefore, features of the embodiment described above were not described again with respect to this embodiment.

In this embodiment, lifting lid assembly 1 comprised a first spring motor 22 and a second spring motor 22'. First spring motor 22 was connected to first spring motor cable 20 and also was mounted to first spring mounting plate 24. Similarly, second spring motor 22' was connected to second spring motor cable 20' and also was mounted to second spring mounting plate 24'. In addition, first spring motor cable 20 was wound around first spring motor 22, and second spring motor cable 20' was wound around second spring motor 22'. First spring motor 22 and second spring motor 22' operated to wind and unwind first spring motor cable 20 and second spring motor cable 20', respectively. The winding of first spring motor cable 20 and second spring motor cable 20' around or unwinding of these cables from first spring motor 22 and second spring motor 22', respectively, allowed first spring motor cable 20 and second spring motor cable 20' to raise or lower lifting lid 2, thereby covering and uncovering the cooking vessel.

Lifting lid assembly 1 further comprised first counterbalance weight 42 and second counterbalance weight 42'. First counterbalance weight 42 was connected to platform 18 by a first counterbalance cable 44 threaded through a first pulley 40. Similarly, second counterbalance weight 42' was connected to second platform 18' by a second counterbalance cable 44' threaded through a second pulley 40'. In addition, first platform 18 and second platform 18' each were a length greater than a length of rectangular top portion 4 of lifting lid 2.

Moreover, first spring motor 22, second spring motor 22', first counterbalance weight 42, and second counterbalance weight 42', provided a sufficient amount of upward force to assist in the raising of lifting lid 2. The amount of upward force required by first spring motor 22, second spring motor 22', first counterbalance weight 42, and second counterbalance weight 42', depended on a weight of lifting lid 2; first shaft 12 and second shaft 12', respectively; and first platform 18 and second platform 18', respectively. In the embodiment described in this example, the weight of lifting lid 2; first shaft 12 and second shaft 12'; and first platform 18 and second platform 18', was a substantially constant value. The substantially constant value was between about 90 pounds (40.9 kg) and about 105 pounds (47.7 kg), and represented a minimum load of lifting lid assembly 1. Thus, when lifting lid assembly 1 was at its minimum load, first spring motor 22, second spring motor 22', first counterbalance weight 42, and second counterbalance weight 42', operated with at least between about 22.5 pounds (10.2 kg) and about 26.25 pounds (11.9 kg) of upward force.

In addition, the maximum amount of force required to assist in the raising of lifting lid 2 was experienced when lifting lid assembly 1 further comprised a removably mounted food carrier apparatus 28; five food carrier trays (not shown), and the like; and a chicken breast product (not shown) placed on each food carrier tray. When lifting lid assembly 1 comprised the above-described elements, the maximum load was between about 125 pounds (56.8 kg) and about 140 pounds (63.6 kg). Thus, when lifting lid assembly 1 was at its maximum load, first spring motor 22, second spring motor 22', first counterbalance weight 42, and second counterbalance weight 42', operated with at least between about 31.25 pounds (14.2 kg) and about 35 pounds (15.9 kg) of upward force.

While the invention has been described in connecting with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It is intended that the specification and the described examples are considered as exemplary only, with the true scope and spirit of the invention indicated by the following claims.

What is claimed is:

1. A lifting lid assembly for raising and lowering a lifting lid of a cooking vessel comprising:
   a lifting lid;
   a first shaft and a second shaft, the first shaft positioned on a first side of the lifting lid, and the second shaft positioned on a second side of the lifting lid, wherein the first side is opposite the second side, each shaft supports the lifting lid, and an upper portion of each shaft is secured to the lifting lid;
   a first platform secured to a lower portion of the first shaft and a second platform secured to a lower portion of the second shaft;
   a first pair of spring motor cables, each of the first spring motor cables connected to the first platform, and a second pair of spring motor cables, each of the second spring motor cables connected to the second platform; and
   a first pair of spring motors, each first spring motor connected to the first platform by at least one of the first spring motor cables, and a second pair of spring motors, each second spring motor connected to the second platform by at least one of the second spring motor cables;
   wherein the first pair of spring motor cables and the second pair of spring motor cables are wound to raise the lifting lid.

2. The lifting lid assembly of claim 1, wherein the first shaft and the second shaft are positioned below the lifting lid, and the upper portion of each shaft is substantially flush with an upper edge portion of the lifting lid.

3. The lifting lid assembly of claim 2, wherein the first pair of spring motors are mounted to a first spring motor mounting plate, the second pair of spring motors are mounted to a second spring motor mounting plate, the first shaft is positioned between the pair of first spring motors, and the second shaft is positioned between the pair of second spring motors.

4. The lifting lid assembly of claim 1, wherein the first shaft is substantially parallel to the second shaft.

5. The lifting lid assembly of claim 1, further comprising:
a vat lip for supporting the lifting lid, a first shaft guide, and a second shaft guide, wherein the first shaft is disposed within the first shaft guide, and the second shaft is disposed within the second shaft guide.

6. The lifting lid assembly of claim 1, wherein the lower portion of the first shaft is below each of the first pair of spring motors, the upper portion of the first shaft is above each of the first pair of spring motors, the lower portion of the second shaft is below each of the second pair of spring motors, and the upper portion of the second shaft is above each of the second pair of spring motors.

7. The lifting lid assembly of claim 1, further comprising:
a removably mounted food carrier apparatus, wherein the food carrier apparatus is suspended beneath the lifting lid.

8. The lifting lid assembly of claim 7, further comprising:
a pair of support rails connected to the lifting lid, wherein the food carrier apparatus comprises a tray carrier having a pair of carrier tray arms for engaging the pair of supporting rails and a plurality of carrier trays.

9. A lifting lid assembly for raising and lowering a lifting lid of a cooking vessel comprising:
a lifting lid;
a first shaft and a second shaft, the first shaft positioned on a first side of the lifting lid, and the second shaft positioned on a second side of the lifting lid, wherein the first side is opposite the second side, each shaft supports the lifting lid, and an upper portion of each shaft is secured to the lifting lid;
a first platform secured to a lower portion of the first shaft and a second platform secured to a lower portion of the second shaft;
a first pair of spring motor cables, each first spring motor cable connected to the first platform, and a second pair of spring motor cables, each second spring motor cable connected to the second platform; and
a first pair of spring motors, each first spring motor connected to the first platform by at least one of the first spring motor cables, and a second pair of spring motors, each second spring motor connected to the second platform by at least one of the second spring motor cables;
wherein the first shaft and the second shaft are positioned below the lifting lid, and the upper portion of each shaft is substantially flush with an upper edge portion of the lifting lid.

10. The lifting lid assembly of claim 9, wherein the first pair of spring motor cables and the second pair of spring motor cables are wound to raise the lifting lid.

11. The lifting lid assembly of claim 10, wherein the first pair of spring motors are mounted to a first spring motor mounting plate, the second pair of spring motors are mounted to a second spring motor mounting plate, the first shaft is positioned between the pair of first spring motors, and the second shaft is positioned between the pair of second spring motors.

12. The lifting lid assembly of claim 9, wherein the first shaft is substantially parallel to the second shaft.

13. The lifting lid assembly of claim 9, further comprising:
a vat lip for supporting the lifting lid, a first shaft guide, and a second shaft guide, wherein the first shaft is disposed within the first shaft guide, and the second shaft is disposed within the second shaft guide.

14. The lifting lid assembly of claim 9, wherein the lower portion of the first shaft is below each of the first pair of spring motors, the upper portion of the first shaft is above each of the first pair of spring motors, the lower portion of the second shaft is below each of the second pair of spring motors, and the upper portion of the second shaft is above each of the second pair of spring motors.

15. The lifting lid assembly of claim 9, further comprising:
a removably mounted food carrier apparatus, wherein the food carrier apparatus is suspended beneath the lifting lid.

16. The lifting lid assembly of claim 15, further comprising:
a pair of support rails connected to the lifting lid, wherein the food carrier apparatus comprises a tray carrier having a pair of carrier tray arms for engaging the pair of supporting rails and a plurality of carrier trays.

17. A lifting lid assembly for raising and lowering a lifting lid of a cooking vessel comprising:
a lifting lid;
a first shaft and a second shaft, the first shaft positioned on a first side of the lifting lid, and the second shaft positioned on a second side of the lifting lid, wherein the first side is opposite the second side, each shaft supports the lifting lid, and an upper portion of each shaft is secured to the lifting lid;
a first platform secured to a lower portion of the first shaft and a second platform secured to a lower portion of the second shaft;
a first spring cable connected to the first platform, and a second spring cable connected to the second platform; and
spring means adapted for assisting in a raising and lowering of the lifting lid, the spring means connected to the first platform by the first spring cable, and to the second platform by the second spring cable;
wherein the first spring cable and the second spring cable are wound to raise the lifting lid, and wherein the first shaft and the second shaft are positioned below the lifting lid, and the upper portion of each shaft is substantially flush with an upper edge portion of the lifting lid.

18. The lifting lid assembly of claim 17, further comprising:
a third spring cable connected to the first platform, and a fourth spring cable connected to the second platform, wherein the spring means comprises a first pair of springs, each first spring connected to the first platform by at least one selected from the group consisting of the first spring cable and the third spring cable, and a second pair of springs, each second spring connected to the second platform by at least one selected from the group consisting of the second spring cable and the first spring cable.

19. The lifting lid assembly of claim 17, further comprising:
a third spring cable connected to the first platform, and a fourth spring cable connected to the second platform, wherein the spring means comprises a first pair of spring motors, each first spring motor connected to the first platform by at least one selected from the group consisting of the first spring cable and the third spring cable, and a second pair of spring motors, each second spring motor connected to the second platform by at least one selected from the group consisting of the second spring cable and the first spring cable.

20. The lifting lid assembly of claim 19, wherein the first pair of spring motors are mounted to a first spring motor mounting plate, the second pair of spring motors are mounted to a second spring motor mounting plate, the first shaft is positioned between the pair of first spring motors, and the second shaft is positioned between the pair of second spring motors.

21. The lifting lid assembly of claim 17, wherein the first shaft is substantially parallel to the second shaft.

22. The lifting lid assembly of claim 17, further comprising:
   a vatlip for supporting the lifting lid, a first shaft guide, and a second shaft guide, wherein the first shaft is disposed within the first shaft guide, and the second shaft is disposed within the second shaft guide.

23. The lifting lid assembly of claim 19, wherein the lower portion of the first shaft is below each of the first pair of spring motors, the upper portion of the first shaft is above each of the first pair of spring motors, the lower portion of the second shaft is below each of the second pair of spring motors, and the upper portion of the second shaft is above each of the second pair of spring motors.

24. The lifting lid assembly of claim 17, further comprising:
   a first counterbalance weight connected to the first platform by a first counterbalance cable threaded through a first pulley; and
   a second counterbalance weight connected to the second platform by a second counterbalance cable threaded through a second pulley.

25. The lifting lid assembly of claim 17, further comprising:
   a removably mounted food carrier apparatus, wherein the food carrier apparatus is suspended beneath the lifting lid.

26. The lifting lid assembly of claim 25, further comprising:
   a pair of support rails connected to the lifting lid, wherein the food carrier apparatus comprises a tray carrier having a pair of carrier tray arms for engaging the pair of supporting rails and a plurality of carrier trays.

27. A lifting lid assembly for raising and lowering a lifting lid of a cooking vessel comprising:
   a lifting lid;
   a first shaft and a second shaft, the first shaft positioned on a first side of the lifting lid, and the second shaft positioned on a second side of the lifting lid, wherein the first side is opposite the second side, each shaft supports the lifting lid, and an upper portion of each shaft is secured to the lifting lid;
   a first platform secured to a lower portion of the first shaft and a second platform secured to a lower portion of the second shaft;
   a first cable connected to the first platform, and a second cable connected to the second platform; and
   means for raising and lowering the lifting lid, wherein the means for raising and lowering the lifting lid is connected to the first platform by the first cable, and to the second platform by the second cable;
   wherein the first shaft and the second shaft are positioned below the lifting lid, and the upper portion of each shaft is substantially flush with an upper edge portion of the lifting lid.

28. The lifting lid assembly of claim 27, wherein the means for raising and lowering the lifting lid comprises a first spring means connected to the first platform by the first cable, and a second spring means connected to the second platform by the second cable, wherein the first cable and the second cable are wound to raise the lifting lid.

29. The lifting lid assembly of claim 28, wherein the first spring means is a first spring and the second spring means is a second spring.

30. The lifting lid assembly of claim 28, wherein the first spring means is a first spring motor, the second spring means is a second spring motor, the first cable is a first spring motor cable, and the second cable is a second spring motor cable.

31. The lifting lid assembly of claim 30, further comprising:
   a third spring motor cable connected to the first platform, and a fourth spring motor cable connected to the second platform, wherein the first spring means further comprises a third spring motor connected to the first platform by the third spring motor cable, and the second spring means further comprises a fourth spring motor connected to the second platform by the fourth spring motor cable.

32. The lifting lid assembly of claim 30, wherein the first spring motor is mounted to a first spring motor mounting plate, and the second spring motor is mounted to a second spring motor mounting plate.

33. The lifting lid assembly of claim 31, wherein the first shaft is positioned between the first spring motor and the third spring motor, and the second shaft is positioned between the second spring motor and the fourth spring motor.

34. The lifting lid assembly of claim 27, wherein the first shaft is substantially parallel to the second shaft.

35. The lifting lid assembly of claim 27, further comprising:
   a vatlip for supporting the lifting lid, a first shaft guide, and a second shaft guide, wherein the first shaft is disposed within the first shaft guide, and the second shaft is disposed within the second shaft guide.

36. The lifting lid assembly of claim 30, wherein the lower portion of the first shaft is below the first spring motor, the upper portion of the first shaft is above the first spring motor, the lower portion of the second shaft is below the second spring motor, and the upper portion of the second shaft is above the second spring motor.

37. The lifting lid assembly of claim 27, wherein the means for raising and lowering the lifting lid further comprises:
   a first counterbalance weight connected to the first platform by a first counterbalance cable threaded through a first pulley; and
   a second counterbalance weight connected to the second platform by a second counterbalance cable threaded through a second pulley.

38. The lifting lid assembly of claim 28, wherein the means for raising and lowering the lifting id further comprises:
   a first counterbalance weight connected to the first platform by a first counterbalance cable threaded through a first pulley; and a second counterbalance weight connected to the second platform by a second counterbalance cable threaded through a second pulley.

39. The lifting lid assembly of claim 29, wherein the means for raising and lowering the lifting lid further comprises:

a first counterbalance weight connected to the first platform by a first counterbalance cable threaded through a first pulley; and a second counterbalance weight connected to the second platform by a second counterbalance cable threaded through a second pulley.

40. The lifting lid assembly of claim 30, wherein the means for raising and lowering the lifting lid further comprises:

a first counterbalance weight connected to the first platform by a first counterbalance cable threaded through a first pulley; and a second counterbalance weight connected to the second platform by a second counterbalance cable threaded through a second pulley.

41. The lifting lid assembly of claim 27, further comprising:

a removably mounted food carrier apparatus, wherein the food carrier apparatus is suspended beneath the lifting lid.

42. The lifting lid assembly of claim 41, further comprising:

a pair of support rails connected to the lifting lid, wherein the food carrier apparatus comprises a tray carrier having a pair of carrier tray arms for engaging the pair of supporting rails and a plurality of carrier trays.

* * * * *